(12) United States Patent
Baker et al.

(10) Patent No.: US 9,482,528 B2
(45) Date of Patent: Nov. 1, 2016

(54) SYSTEMS AND METHODS FOR PERSISTENT SURVEILLANCE AND LARGE VOLUME DATA STREAMING

(75) Inventors: Patrick T. Baker, Washington, DC (US); Geoffrey G. Hazel, Raleigh, NC (US); David J. Fields, Burke, VA (US); Anna O. Bilska-Wolak, Raleigh, NC (US)

(73) Assignee: Logos Technologies LLC, Fairfax, VA (US)

( * ) Notice: Subject to any disclaimer, the term of this patent is extended or adjusted under 35 U.S.C. 154(b) by 517 days.

(21) Appl. No.: 13/496,829

(22) PCT Filed: Sep. 17, 2010

(86) PCT No.: PCT/US2010/049310
§ 371 (c)(1),
(2), (4) Date: May 29, 2012

(87) PCT Pub. No.: WO2011/068582
PCT Pub. Date: Jun. 9, 2011

(65) Prior Publication Data
US 2012/0229607 A1    Sep. 13, 2012

Related U.S. Application Data

(60) Provisional application No. 61/346,215, filed on May 19, 2010, provisional application No. 61/295,423, filed on Jan. 15, 2010, provisional application No. 61/243,902, filed on Sep. 18, 2009.

(51) Int. Cl.
*G01C 11/00* (2006.01)
*H04N 13/02* (2006.01)

(52) U.S. Cl.
CPC ........... *G01C 11/00* (2013.01); *H04N 13/0221* (2013.01)

(58) Field of Classification Search
CPC ........................ G01C 11/00; H04N 13/0221
See application file for complete search history.

(56) References Cited

U.S. PATENT DOCUMENTS 5,649,032 A    7/1997  Burt et al.
6,163,337 A  * 12/2000  Azuma et al. .................. 348/43
(Continued)

FOREIGN PATENT DOCUMENTS

DE    102007048857    *  4/2009
WO    WO 97/01135        1/1997

OTHER PUBLICATIONS

Irani et al., "Efficient Representations of Video Sequences and Their Applications," Signal Processing, Image Communications 8, 1996, pp. 327-351.*

(Continued)

*Primary Examiner* — Thai Tran
*Assistant Examiner* — Christopher T Braniff
(74) *Attorney, Agent, or Firm* — Arnold & Porter LLP

(57) ABSTRACT

In general, the present disclosure relates to persistent surveillance (PS), wide medium and small in area, and large volume data streaming (LVSD), e.g., from orbiting aircraft or spacecraft, and PS/LVSD specific data compression. In certain aspects, the PS specific data or LVSD compression and image alignment may utilize registration of images via accurate knowledge of camera position, pointing, calibration, and a 3D model of the surveillance area. Photogrammetric systems and methods to compress PS specific data or LVSD while minimizing loss are provided. In certain embodiments, to achieve data compression while minimizing loss, a depth model is generated, and imagery is registered to the depth model.

8 Claims, 9 Drawing Sheets

(56) References Cited

U.S. PATENT DOCUMENTS

| | | | |
|---|---|---|---|
| 6,587,601 B1* | 7/2003 | Hsu et al. | 382/294 |
| 6,597,818 B2* | 7/2003 | Kumar et al. | 382/294 |
| 6,639,596 B1* | 10/2003 | Shum et al. | 345/427 |
| 7,313,252 B2* | 12/2007 | Matei et al. | 382/100 |
| 8,369,399 B2* | 2/2013 | Egnal | G01C 11/02 375/240.08 |
| 2002/0036104 A1* | 3/2002 | Kerrebrock et al. | 180/6.2 |
| 2004/0100473 A1* | 5/2004 | Grzeszczuk et al. | 345/581 |
| 2005/0276440 A1* | 12/2005 | Rhoads et al. | 382/100 |
| 2006/0077255 A1* | 4/2006 | Cheng | 348/143 |
| 2007/0241957 A1* | 10/2007 | Murphy | 342/357.02 |
| 2007/0285422 A1* | 12/2007 | Nayar et al. | 345/426 |
| 2009/0154565 A1* | 6/2009 | Jeong et al. | 375/240.16 |

OTHER PUBLICATIONS

Ostermann et al., "Viding Coding with H.264/AVC: Tools, Performance, and Complexity," IEEE Circuits and Systems Magazine, First Quarter, 2004, pp. 7-28.*

Irani et al., "Efficient representations of video sequences and their applications," *Signal Process: Image Communications* 8:327-351 (1996).

Partial International Search Report in International Application No. PCT/US2010/049310 dated Feb. 20, 2012.

* cited by examiner

SYSTEMS AND METHODS FOR PERSISTENT SURVEILLANCE AND LARGE VOLUME DATA STREAMING

RELATED APPLICATIONS

This application claims the benefit of the filing of U.S. Provisional Application No. 61/243,902, filed Sep. 18, 2009, U.S. Provisional Application No. 61/295,423, filed Jan. 15, 2010, and U.S. Provisional Application No. 61/346,215, filed May 19, 2010, the contents of which are each herein incorporated by reference.

GOVT CONTRACT STATEMENT

This invention was made with United States Government support under Contract No. W31P4Q-09-C-0301, awarded by US ARMY CONTRACTING COMMAND CCAM-RD-A ANTIONETTE ROSS MCCLINTON (256)842-1566 AMCOM CONTRACTING CENTER REDSTONE ARSENAL AL 35898-5280 WEAPON SYSTEM: GR&D ANTIONETTE.MCCLINTON@U.S.ARMY.MIL, and administered by: DCMA VIRGINIA 10500 BATTLEVIEW PKWY SUITE 200 MANASSAS VA 20109-2342. The United States Government has certain rights in the invention.

TECHNICAL FIELD

This invention relates to the field of persistent surveillance (PS) imagery and large volume data streaming (LVSD), e.g., from orbiting aircraft or spacecraft, and PS/LVSD specific data compression.

BACKGROUND

Persistent surveillance is an imagery type that has proved to be useful for tactical and forensic uses in the Iraq and Afghanistan wars, and it will be effective, e.g., for use in of low level conflicts in the future. However, its synoptic coverage over hours, weeks, and months strains both available bandwidth and the logistics of transmitting the data. Current spatial compression solutions (JPEG, JPEG2000) can compress wide area persistent surveillance (WAPS) data to some degree, but are limited to 10 to 30 times compression. Motion compression algorithms such as H.264 can perform at up to 60 times compression for panchromatic data, but may lose very low pixel count movers at those ratios. Because of the amount of data generated by these platforms, a compression ratio of up to 500× is desirable. These kinds of compression ratios would allow for much broader dissemination of the data, and with the lower latency that is required to turn the information into actionable intelligence.

Future WAPS programs such as the Autonomous Real-time Ground Ubiquitous Surveillance-Imaging System program (ARGUS-IS) will generate very large data volumes. Current sensors, such as Constant Hawk, already challenge the manageable limits of available data storage, transfer and processing capabilities. As WAPS systems like ARGUS-IS continue to expand both frame rate and spatial resolution capabilities (Table 1), the "ballooning" data volumes create even more stressing data handling requirements.

TABLE 1

ARGUS-IS System Parameters

| Parameter Description | Value |
| --- | --- |
| Field of View (FOV) | 60°/60° |
| Instantaneous Field of View (IFOV) | 26 μrad |
| Nadir GSD @ 20,000' (~6 km) | 15.2 cm |
| Nadir GSD @ 30,000' (~9 km) | 22.9 cm |
| Pixels | 1.8/109 |
| Full-field Update Rate | 12-15 Hz |

With a smaller instantaneous field of view, increased pixel count and higher anticipated frame rate, ARGUS-IS data rates will be on the order of 20 GB/s. The difficulty in managing such high data rates is further compounded by an increasingly ambitious concept of operations (CONOPs). For example, the ARGUS-IS data handling CONOPs calls for both the transmission of 50 regional data streams to the ground for real-time analysis, and for the storage of all collected data, for future forensic analysis.

WAPS data storage is a challenging problem. As previously stated, ARGUS-IS data rates are on the order of 20 GB/s. This is equivalent to about 1500 TB/day. Storing this quantity of data is an expensive (cost, power, weight) proposition for ground based archive systems, with an amplified expense for required on-board airborne archive solutions. Using 2008 hard drive technology, the number of drives required to store one day of ARGUS-IS data cost approximately $450K. Given the current Constant Hawk archival procedure of storing up to two months of data, storage of data rapidly becomes a cost prohibitive endeavor. In addition, the power requirements and associated weight for this quantity of hard drives is suboptimal for ground-based data archives and incompatible with airborne archive solutions, due to payload constraints (size, weight and power). Use of flash drive technology offers some relief with respect to power requirements, but is still well short of acceptable cost and weight. Data compression offers a practical solution to decreasing storage "expense" across the board.

WAPS data transfer rates are also a challenging problem. Table 2 provides a comparison of data transfer rates (bandwidth) and compression ratios required to successfully transmit ARGUS-IS data volumes over various ground (OC-192, OC-48 and T-1) and air (TCDL, CDL and Double CDL) data links. Without compression, sustainable real-time data transfer is unachievable. Even compression methods such as H.264, which gives a compression ratio of up to 60 times, but which loses very low pixel count movers in imagery, fall short of desired data transfer requirements, allowing for only a small fraction of the data to be transmitted in real-time. In contrast, compression ratios of 100 to 500 enable the use of high-bandwidth land-line transfers and offer a reasonable compromise at achieving air-link transfers, especially when used in conjunction with other ARGUS-IS data collection and exploitation procedures (i.e. transfer of only regional data streams over available down-links).

TABLE 2

Data transfer and compression rate comparison

| Data Link | Bandwidth | Compression Required |
| --- | --- | --- |
| OC-192 | 9,953.28 Mb/s | 16 |
| OC-48 | 2,488.32 Mb/s | 64 |
| T-1 | 1,544 Mb/s | 100,000 |

TABLE 2-continued

Data transfer and compression rate comparison

| Data Link | Bandwidth | Compression Required |
|---|---|---|
| TCDL | 10.71 Mb/s | 14,869 |
| CDL | 274 Mb/s | 563 |
| Double CDL | 548 Mb/s | 282 |

The present invention solves the problem of accurate registration of wide area data, thereby solving many problems in tracking, change detection, analysis, and compression. The present invention provides systems and methods for compression and analysis of persistent surveillance data, as will be explained below.

SUMMARY

The present invention is best understood with reference to the claims, the entire specification, and all of the drawings submitted herewith, which describe the devices, systems, processor program products and methods of the present invention in greater detail than this summary, which is merely intended to convey aspects of illustrative embodiments of the present invention.

Processing of persistent surveillance data and large volume streaming data (LVSD) has been limited by the need for a better method for rapidly and precisely aligning the data. Alignment of the data allows for new methods of image compression, change detection, and tracking of vehicles, people, and animals. The improvements in registration outlined in the present disclosure form a foundation for subsequent processing of orbiting aerial surveillance, to include compression, change detection and tracking. However, the possible applications of this registration technique are not limited to only these applications.

In a first aspect of the present disclosure, systems and methods to compress PS specific data and LVSD while minimizing information loss are provided. In certain embodiments, to achieve data compression while minimizing loss, a photogrammetric approach is utilized wherein imagery is registered to a depth model of the world. The depth model may be a textured 3D model of the world, which may be created onboard an aircraft substantially contemporaneously with imagery capture. The depth model can act to predict what the captured imagery should look like, based at least in part on current camera location.

In one embodiment, a photogrammetric method for compressing PS specific data and LVSD is provided. The method generally comprises: generating a depth model of a location; capturing imagery of said location; registering the captured imagery to said depth model; generating a difference image between the captured imagery and projected model imagery; and spatially compressing the difference image to generate a compressed PS specific or LVSD datastream. In certain embodiments, the difference image reflects the difference between the captured imagery and predicted imagery based on the depth model. The depth model can be obtained from a previous persistent surveillance (PS) collection or generated substantially contemporaneously with imagery capture or may be generated via some wholly different sensing modality, such as LIDAR.

In other embodiments, methods are provided further comprising: decompressing the compressed PS specific or LVSD datastream to generate a decompressed difference image; and adding the decompressed difference image to the imagery predicted based on the depth model to generate a reconstructed, decompressed image.

In yet other embodiments, photogrammetric methods for generating a depth model for use in PS specific data or LVSD compression are provided. Such methods generally comprise: capturing location imagery and generating digital elevation maps; extracting texture of stationary surfaces; texture mapping to digital elevation map; and performing scene prediction refinement of textured map based, at least in part, on aircraft position and camera calibration. In certain embodiments, a plane sweep stereo algorithm is used to generate the digital elevation map. In other embodiments, a stereo algorithm is used to generate the digital elevation map.

In addition to the applications for compression, the high accuracy registration to a depth model will result in very stable imagery. This stability is useful to obtain precise geolocation from the imagery for targeting or other applications. This stable imagery also enables precise extraction of the photometric properties of the scene, such as the bidirectional reflectance distribution function (BRDF). This stable imagery and knowledge of the photometric properties enables the imagery to be used as a basis for detecting changes in the scene. These changes include but are not limited to tracking, detection of changes, and extraction of surface shape based on the view of a particular piece of ground during an aircraft orbit and/or a long duration image stream.

Additional objects, advantages and novel features of this invention will be set forth in part in the description that follows, and in part will become apparent to those skilled in the art upon examination of the following description, or may be learned by practicing the invention.

BRIEF DESCRIPTION OF THE DRAWINGS

In the accompanying drawings that form a part of the specification and are to be read in conjunction therewith, the present invention is illustrated by way of example and not limitation, with like reference numerals referring to like elements, wherein.

DETAILED DESCRIPTION

Figure 1:
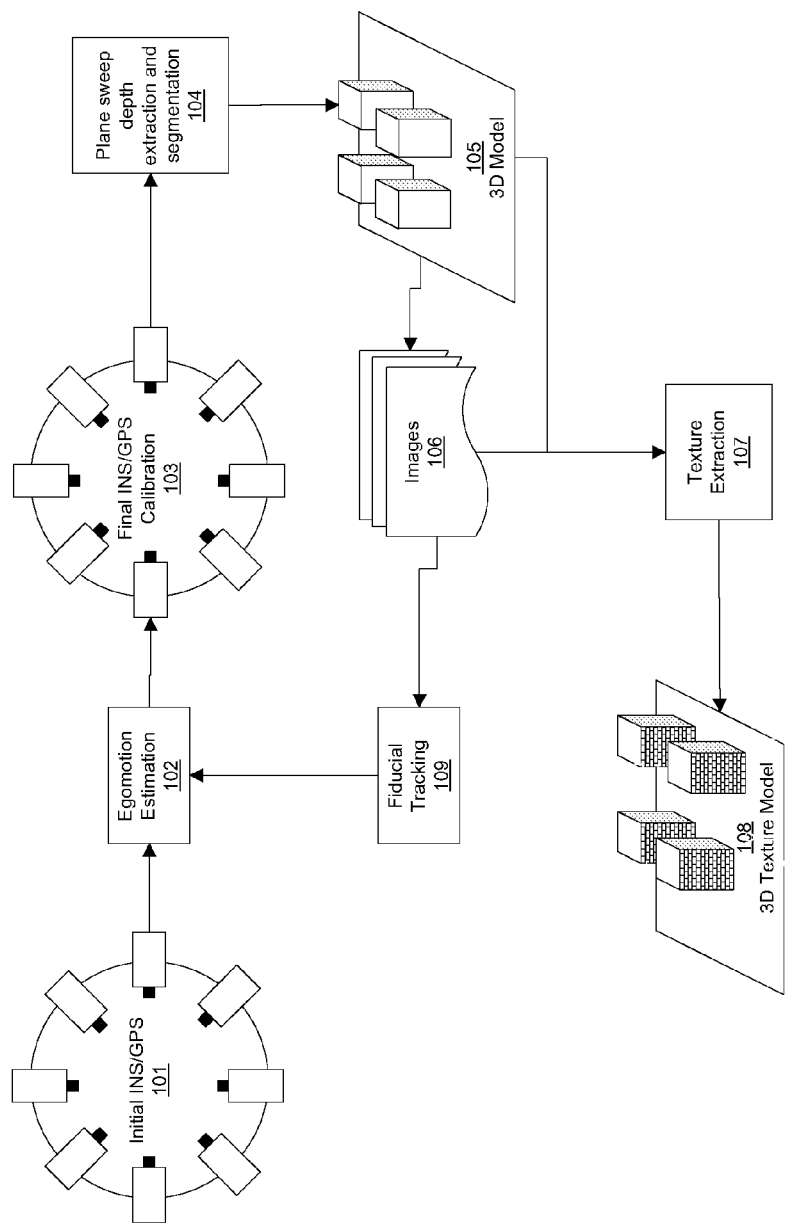
FIG. 1 illustrates an exemplary method for generating a depth model in accordance with an embodiment of the disclosure.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention.

In general, the present disclosure relates to persistent surveillance (PS), wide, medium and small in area, and large volume data streaming (LVSD), e.g., from orbiting aircraft or spacecraft, and PS/LVSD specific data compression. Certain characteristics of PS and LVSD that are well suited for the data compression systems and photogrammetric methods described herein include but are not limited to: (1) that the same scene is imaged over and over again; (2) that very little of the scene is composed of moving objects; (3) that there is a good general knowledge of the sensor position and pointing during surveillance; (4) that vertical scene structure is small compared to sensor standoff range; etc. As will be explained in further detail herein, in certain aspects, the PS specific data or LVSD compression and image alignment may utilize registration of images via accurate knowledge of camera position, pointing, calibration, and a 3D model of the surveillance area.

Registration of wide area data is a key enabling technology not only for compression, but also for other downstream applications such as analysis, change detection, and tracking. This application describes a novel wide area registration method which works to precisely position pixels in the world, providing a stable foundation on which these subsequent processes can operate more effectively. Accurate knowledge of pixel pointing is the basis for knowing what a patch of ground looks like, so that changes can be detected, tracked, located, and encoded.

In a first aspect of the present disclosure, photogrammetric systems and methods to compress PS specific data or LVSD while minimizing loss are provided. In certain embodiments, to achieve data compression while minimizing loss, a depth model is generated, and imagery is registered to the depth model. The depth model may be purely geometric or a texture mapped 3D model, which may be created onboard an aircraft substantially contemporaneously with imagery capture. The depth model can act to predict what the captured imagery should look like, based at least in part on current camera location, pointing, calibration, and sun position. Further, the depth model and imagery may be generated for a specific location of interest and may range in size. For instance, the location of interest may be a building, a city block, a city, a state, a multi-state region, etc. The invention is not limited with respect to the size or type of geolocation to be modeled or imaged.

As will be explained in further detail herein, in accordance with certain aspects of the present disclosure, the image prediction can itself serve as a data compression algorithm in that the depth model can be transmitted at set intervals (e.g., about once an hour, etc.) rather than as continuous imagery, and only updates as to how the actual imagery differs from imagery predicted by the model must be sent continuously.

Photogrammetric Modeling Methodology

In a first aspect, the present disclosure relates to data compression technology well suited for persistent surveillance, e.g., from orbiting aircraft, such as PS or LVSD. In accordance with certain embodiments, PS data or LVSD is taken by an aircraft orbiting an area of interest, usually a city, for hours at a time. PS data or LVSD may be obtained using any suitable system known in the art, including without limitation Constant Hawk, Angel Fire, ARGUS-IS, MASIVS, and Gordon Stare. Such systems are capable of capturing from 50-800 pixels at rates up to ten frames per second, which translates to up to 150 Gb/s, over missions lasting hours.

As sensor outputs far outstrip available data bandwidth, compression of the vast quantities of data collected by PS or LVSD imaging systems becomes a necessity. In accordance with the systems and methods described herein, accurate registration of acquired images via depth modeling of the surveillance area improves data compression ratios. Without intending to be limited by theory, compression can encode changes which can't be compressed with a static model, such as the independent movement of objects and appearance of new objects. By using processing power on creating accurate models before transmission of data, compression ratios can be achieved which can open up new applications for imagery access.

The sensor outputs ephemeris (GPS position and INS pointing), which are estimates of the true values of these parameters. In addition, certain information about the camera modeling parameters may be obtained (focal length, distortions, etc), but not to the accuracy necessary for precise registration. Improved estimates of these camera model and ephemeris parameters are first extracted. One embodiment of a method to extract these parameters more accurately is to track points over the course of a sequence of frames. These points can be used as the input for a bundle adjustment method that improves the initial estimates of the ephemeris and camera model to estimates more consistent with the imagery.

In certain embodiments, compression ratios may be improved by factoring out parallax induced motion with a sufficiently accurate depth model. By way of example, parallax effects may be reduced by creating high resolution 3D models which include accurate locations for depth discontinuities.

In certain circumstances, the image information will not be sufficient to extract an accurate 3D model, and as such the systems and methods as described herein may include a parallel track of Light Detection and Ranging (LIDAR) data which will support depth extraction. In addition to using the models for compression, in certain aspects, the models may also be translated into a 3D markup language, such as the Distributed Interactive Simulation (DIS) X3D standard, used by military organizations for wargaming.

As will be explained in further detail herein, any suitable methodology may be used to generate a depth model. By way of example, a plane sweep algorithm may be utilized in certain embodiments for depth edge extraction during model construction. In this regard, it is noted that image areas and locations in which depth is difficult to extract will be those areas which have very low illumination differences across the edge, and as such are just those areas and locations where precise depth edges will matter less for compression.

Another example of a method to generate the depth model is to render stereo pairs from multiple pairs of images around the orbit. These stereo pairs (e.g., left and right images) are enabled by high quality ephemeris and camera models. Depth estimates from multiple pairs of images around the orbit can be combined via a median filter or other suitable technique to produce an accurate 3D model of the scene suitable for high quality image alignment. This stereo depth model can be used on its own or as a basis for more refined depth modeling, such as by voxel carving or plane sweep.

By way of non-limiting example, extraction of a textured depth model, e.g., a geometric textured 3D model, in accordance with one embodiment of the present disclosure is illustrated in FIG. 1. Extraction of a textured depth model 100 begins at 101 with image capture and an initial INS (orientation) and GPS (position) for the camera. Using the imagery, patches of ground which are flat and devoid of moving objects may be tracked, and utilized to estimate the egomotion (self motion) and calibration of the camera system at 102. From there, a final INS/GPS estimate for the camera system will be calibrated at 103. A depth model 105, which does not contain textures may then be constructed using any suitable algorithm, e.g., a multi-baseline plane sweep stereo algorithm, at 104. Finally, the depth model is texture mapped (or "painted") with texture estimates 107 extracted from the imagery 106 to generate a textured depth model 108.

In certain embodiments, the initial depth model may be estimated over the course of the first orbit. The texture mapping onto the depth model is where data compression will generally be obtained. Each segmented planar patch of ground imaged can generally be analyzed separately, estimating its aspect throughout the orbit of the aircraft. Although the patch's pixel values will change, this change will be highly compressible over the course of the orbit. Further, these patch aspect estimates may be continually updated over the course of the mission to account for changing weather, changing sun angle, and changing shadows. These patch aspect updates are integrated into the data stream, e.g., via fiducial tracking at 109.

In other embodiments, the compression is obtained by projecting the imagery to an orthographic view. An orthographic view simulates a stationary camera with infinite focal length, and results in an image sequence which is stable except for moving objects and lightning changes. This type of image sequence can be compressed well using standard compression such as MPEG-2 or h.264, but is more highly compressible with specialized techniques we describe later.

This initial depth model and knowledge of the aspect of the planar patches can also be used as foundation for tracking and change detection. Precise alignment knowledge based on the knowledge of ephemeris, camera model, and depth model allows for extraction of unmodeled changes in the image, due to moving objects or the sudden appearance of new objects.

Compression Architecture

Figure 2:
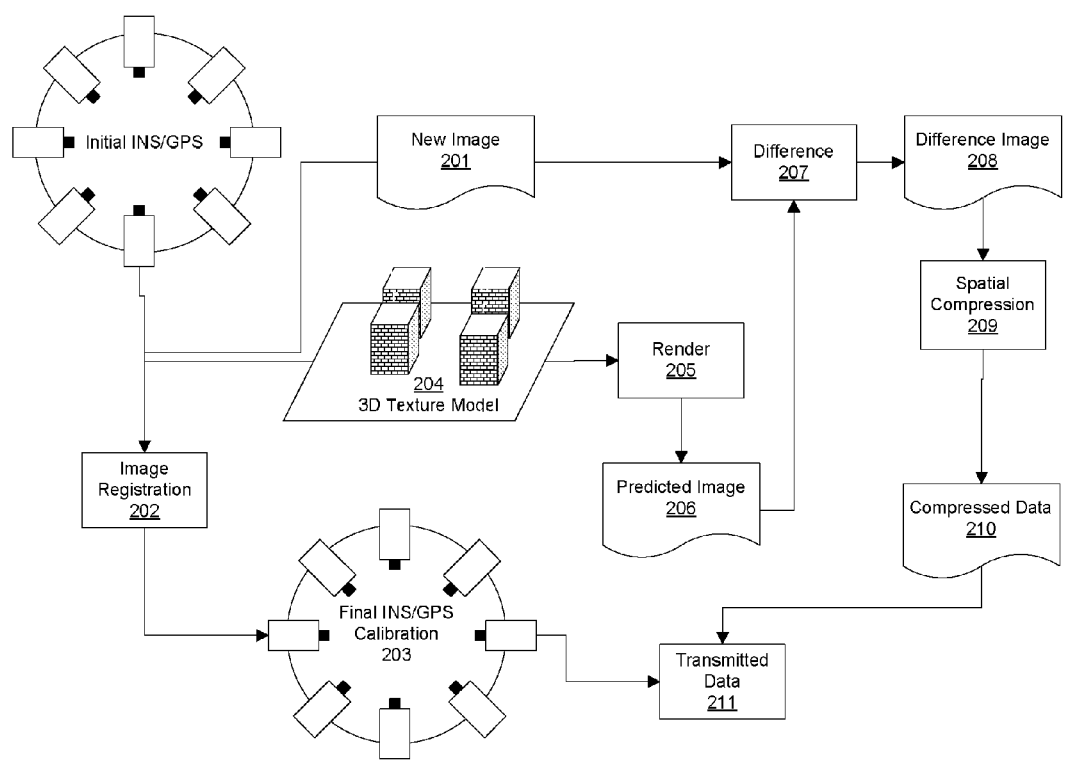
FIG. 2 illustrates an exemplary compression methodology according to an embodiment of the disclosure.
Figure 3:
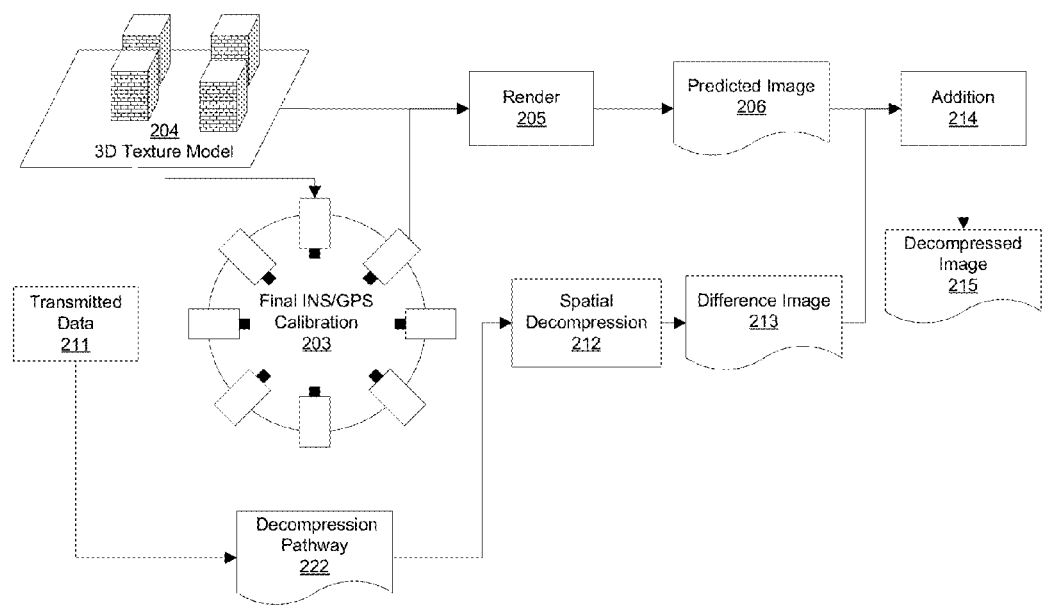
FIG. 3 illustrates an exemplary decompression methodology according to an embodiment of the disclosure.

By way of non-limiting example, general approaches for compression and decompression of data in accordance with certain embodiments of the present disclosure are illustrated in FIGS. 2 and 3. With reference to FIG. 2, inputs to data compression include imagery data from one or more cameras or camera complexes, and the camera(s) position (from GPS) and orientation (from INS). Another input is an initial camera model. Output includes a bitstream to be transmitted, e.g., to onboard storage, to a ground receiver, or both. With reference to FIG. 3, input to the decompression includes the compression bitstream, which will then be decompressed to reconstruct the imagery directly from the camera(s). This imagery may be georegistered by registering the imagery or model to a base layer with known geocoordinates.

More specifically, with reference to FIG. 2, once a depth model has been created (e.g., as in FIG. 1), data may be compressed 200 to generate a compression bitstream 210, as illustrated in FIG. 2. In accordance with certain embodiments, every frame may be compressed if desired, alternatively every other frame may be compressed, etc. In accordance with the compression methodology 200, at every frame to be compressed, a new image 201 is obtained from the sensor. The new image is used to calculate improved INS/GPS information 203 through an image registration process 202. The improved estimate of camera location and orientation is then used to render 205 the texture mapped depth model 204 back to the image plane. The difference 207 between the predicted 206 and actual image 201 will then be utilized to obtain a difference image 208. The difference image 208 will be spatially compressed 209, and the compressed data bitstream 210 will be transmitted 211 with the improved INS/GPS 203.

The texture map on the patches can carry an estimate of the bidirectional reflectance distribution function (BRDF). That estimate, combined with knowledge of the sun position, gives a very accurate estimate of the current image pixel values.

Turning to FIG. 3, an exemplary decompression methodology 220 is illustrated. Initially, the improved INS/GPS 203 and compressed bitstream 210 is transmitted 211 to the decompression pathway 222. The textured depth model 204 is projected/rendered 205 to the image plane to create a predicted image 206. The compressed bitstream 210 is spatially decompressed 212, a difference image 213 is generated, and the difference image 213 is added back 214 to the predicted image 206 to obtain the decompressed image 215.

The only source of potential loss during compression/decompression is the spatial compression of the difference image. There will of course be deviations from the depth model due to illumination changes, model misestimation, air light, weather, and other noise. These deviations from the model could themselves be modeled. We later detail examples of how models can be used to reduce deviations.

Exemplary Methodology

In accordance with certain embodiments of the present disclosure, exemplary systems and methods are envisioned as described below. In addition, Appendix A illustrates details of exemplary embodiments of the present disclosure. However, as understood by those of skill in the art, a variety of changes may be made to the configuration, design and construction of the disclosed embodiments. Hence, reference herein to specific details is by way of example only and not by way of limitation.

Example A

Initial Model Extraction

The following example provides an illustrative method to obtain a depth model of the world's horizontal surfaces. In certain embodiments, the depth model may provide an estimate which is accurate to within approximately a meter, and is also aligned with the imagery obtained from PS or LVSD.

In a preferred approach, the depth of the scene is directly extracted from the imagery. For the purposes of data compression, the scene data will contain sufficient information for creation of an accurate depth model. In cases where texture is insufficient to extract high resolution 3D data, a coarse 3D model can still be useful for compression. The result of this initial model extraction will be a triangulated mesh model of the world, combined with an image of the texture on top of each triangle patch. That texture mapped depth model is what will be rendered using the current location of the aircraft for purposes of compression. The depth model could also be in the form of a mesh with polygons other than triangles, or a voxel representation or a digital elevation map.

LIDAR data or other range data may also be used as an adjunct to improve accuracy in areas difficult to extract via the imagery. LIDAR does provide very high resolution models of the world, but must be precisely georegistered with the PS data or LVSD so that the textures from the imagery can be mapped to the planar surfaces.

The creation of the initial model will be processor intensive. However, the techniques utilized for model extraction are highly parallelizable and can be implemented on specialized graphics hardware or massively parallel processor architectures.

Step A: Camera Position and Orientation

Initially, in rendering the depth model, an Algorithm is provided which takes PS or LVSD imagery and INS/GPS readings as inputs and returns improved camera orientation estimates. The first task is to calculate positions and orientations for the cameras more accurately than what is measured by GPS and INS. The initial INS and GPS parameters need only be coarsely accurate. A bundle adjustment process will create position and pointing estimates accurate enough to form the basis for a compression method based on extremely accurate rendering.

Given an accurate calibration of the system, it is theoretically sufficient to pick one location on the ground which is flat, in constant view, has no movers, and is not rotationally symmetric or isotropic in order to extract the pointing of the camera system. However, as many fiducial locations will be chosen as possible which have the flat, constant view, and no mover properties. To execute a bundle adjustment, first points are tracked using, for example, normalized cross correlation on base patches extracted from one frame or many frames through an orbit. Other methods of point tracking could be employed. These tracked points form the input to a bundle adjustment, which uses the geometry of stable points to find upgraded pointing, positioning, and calibration through a nonlinear calibration such as Levenberg-Marquardt. This results in point accurate to the ground sampling distance (GSD) of the input imagery.

The internal calibration parameters are important to extract accurately so that the imagery lines up well enough to extract models. The parameters necessary to extract can vary greatly, depending on the sensor used to capture the data. Examples of calibration parameters are focal length, skew, center of projection, aspect ratio, and nonlinear distortion (radial or tangential). In the case of multiple sensors, there may be an exterior orientation for each camera as well.

For maximum accuracy, a joint optimization of 3D points and camera calibration plus ephemeris can be executed. Bundle adjustment operating on extracted points and the camera ephemeris is standard. In certain embodiments, bundle adjustment may be applied to improve not only the internal calibration parameters of a single parameter, but can also be applied to improve the external calibration among a set of cameras comprising a persistent surveillance sensor.

Step B: Depth Models from PS or LVSD

Following camera position and orientation extraction, an algorithm which takes PS or LVSD imagery and a GPS/INS reading and a coarse depth model, and returns a set of patches with associated depths which characterize a 3D model is provided. PS or LVSD is ideally suited to a stereo depth extraction technique called "plane sweep", first published by Collins in 1996 for stereo reconstruction. This technique essentially sweeps a plane through a discretized set of possible depths and renders the images from all cameras onto each depth plane. Locations on the depth planes where the imagery matches from many possible cameras indicate a real planar patch in space.

In the context of PS or LVSD application, surfaces can be considered horizontal. Even surfaces which are not precisely horizontal are either not textured enough to matter at the resolutions of PS or LVSD, or not steeply pitched enough to affect the imagery significantly. The surfaces which are not modeled well with this horizontal constraint will reduce compression ratios.

The depth range is very shallow, needing only 40 hypothesized depth planes for half meter depth resolution (with 20 meter buildings/error in DEM), lessening objections based on computational cost. Computational cost will be significant with this algorithm, but with one dedicated Virtex 5 FPGA, rendering these 40 depth levels could be done at a frame rate for the pixel count of the, e.g., current Constant Hawk system.

The patch matching for multiple hypothesized depths gives a straightforward way to take into account occasionally occluded areas and areas which have occasional traffic. Various subsets of the rendered images at a particular depth may allow for image matching, and these would correspond to times where the underlying surface is visible.

Figure 4:
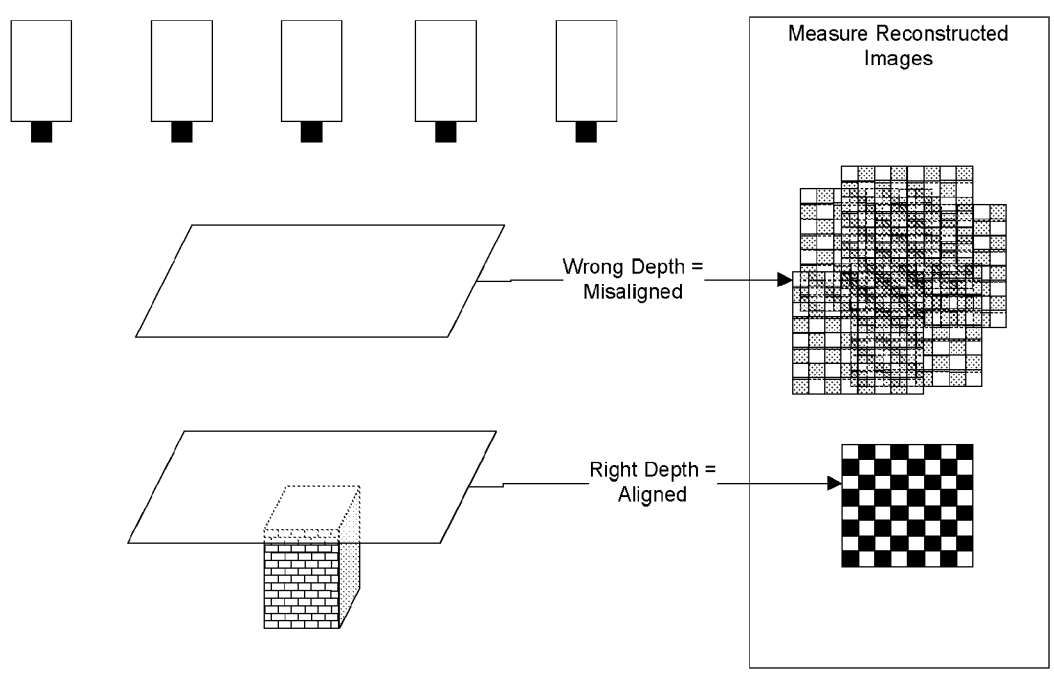
FIG. 4 illustrates an exemplary plane sweep algorithm according to an embodiment of the disclosure.

In order to find the correct depth for a particular location, the images do not need to be matched precisely. Instead, for a particular hypothesized depth, the rendered images may be averaged from all the viewpoints of the orbit. See, e.g., FIG. 4 for an illustrative depictive of a plane sweep depth algorithm showing an averaged reconstructed image. As shown in FIG. 4, if the hypothesized depth is correct at a particular location, then the average image will have more sharp edges at that location. The presence of sharp edges is easily measured with the presence of high frequency components (or high derivatives) in a particular patch. Because there are so many images (the advantage of working with PS or LVSD), the metric will be effective in finding the correct depth. Each pixel can thus be segmented in the persistent area by assigning it to the depth which maximizes the sharp edges. Pixels which are connected and belong to the same depth will be part of the same patch.

By using small support metrics for blurriness (like derivatives), depth segmentation can be high resolution. The plane sweep algorithm ultimately will return a jigsaw puzzle of patches, with each piece having its own depth, and covering the area under surveillance.

An alternative to plane sweep is to use stereo projections to extract pointwise depth estimates for multiple pairs of images taken by the same camera at different times. This embodiment of depth modeling eliminates the need for assumptions about planarity.

The first step in extraction of depth via stereo is to construct stereo image pairs based on images taken at different places during the orbit. These pairs can be antipodal pairs or pairs which are more closely spaced. The stereo image pairs have the quality that all motion due to parallax is only in one direction.

Based on the stereo pairs (e.g., left and right image pairs), we can then extract the shift ("disparity") which exists between corresponding points in each side of the image pair. This disparity encodes a depth estimate at that point in the scene. It is a matter of the known geometry of stereo camera pairs to extract 3D point locations from disparities.

Figure 7:
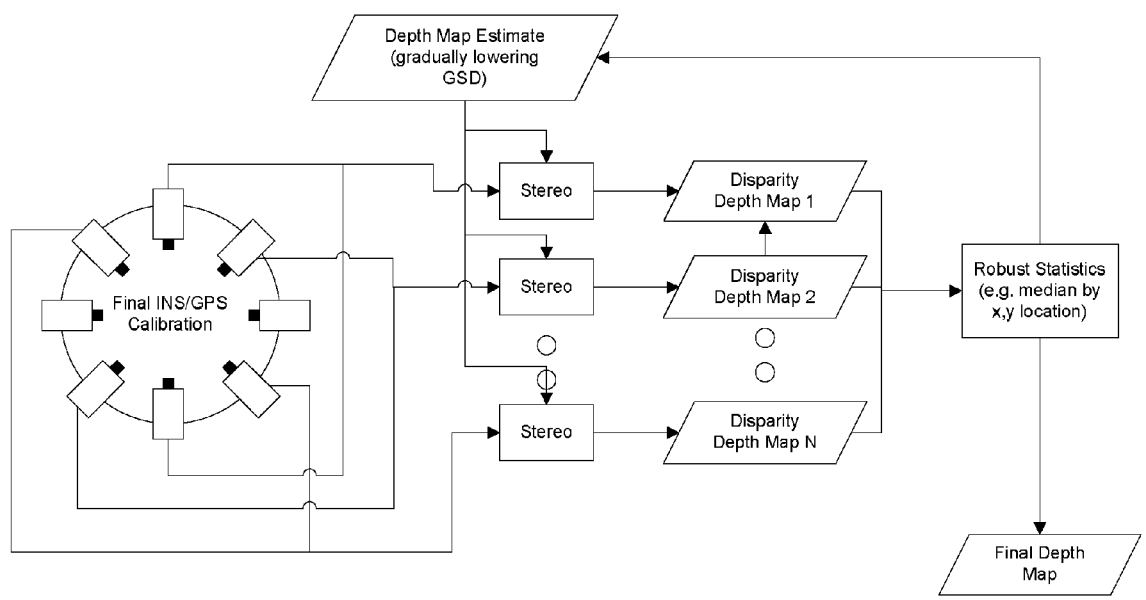
FIG. 7 illustrates an exemplary stereo depth extraction algorithm according to an embodiment of the disclosure.

Depth estimates from multiple stereo pairs of images around the scene may be collected and statistical methods used (median is one possibility) to estimate the depth at a particular location. See, e.g., FIG. 7 In FIG. 7, the diagram shows the calibrated cameras around the orbit. Pairs of cameras are used in a stereo configuration to extract a depth map for each pair, with the help of an initial depth estimate. These depth maps are combined with robust statistics to create a new depth map. This process operates iteratively, reducing the GSD, until a final depth map at low GSD is obtained.

Step C: Textures from Horizontal Patches

Following the initial generation of a 3D model, an algorithm is used which takes PS or LVSD and a refined depth model as input and returns a mapping of image intensities to locations on each horizontal patch. The plane sweep method of constructing depth models completed for Step B provides firm foundation on which to extract a texture model. A depth estimation for a particular patch is the result of matching reprojected textures from multiple images taken from multiple locations. These reprojected textures will not be identical, being taken at different times and from different angles. Following initial model generation, patch measurements will be collected and a single patch texture will be estimated which will be applied to the 3D model for rendering. As discussed further in Example C, a texture model algorithm will be provided which will account for changes over the course of an orbit. These textures will include a model for the bidirectional reflectance distribution function (BRDF) to account for the texture changing appearance based on the sun-surface-camera geometry.

Example B

Compression Algorithm

Example B provides an improved compression algorithm following from Example A.

Step A: Rendering Based on Horizontal Patches

Step A provides an algorithm to render a high resolution depth model accurately. Rendering based on a 3D model is a well understood process. The world will be modeled as a set of textured patches. The model will be rendered to the image plane. The texture maps which are created from the imagery will be projected onto a 3D model.

Step B: Register Imagery to Depth Model

Step B provides an algorithm to register real PS or LVSD imagery to predicted imagery. Given the rendered (predicted) imagery, the current imagery will be registered to the best accuracy possible. This will entail optimizing the orientation of the camera using a process similar to that in Example A.

Step C: Implement Spatial Compression

Step C provides an algorithm to spatially compress the difference images between predicted and real PS or LVSD imagery. A standard spatial compression algorithm will be implemented, which is appropriate for the difference images output, when the rendered imagery is substracted from the real imagery. This may, e.g., be a DCT type algorithm, such as JPEG, or a wavelet algorithm such as JPEG2000.

Step D: Compress Imagery Against Rendered Model

Step D provides a basic implementation of the full compression pipeline. The outputs of Steps B and C will be used to implement the compression pipeline based on high resolution model creation. This will entail taking a difference image from the measured to the predicted image, and applying spatial compression.

There are three components to the compressed data stream. First is the 3D model extracted from the scene. This model will only need to be extracted once, at the beginning of the collect. This will require at most one full frame worth of data. Second is the texture map applied to the 3D model. Third are the moving objects, which will be sent down independently for each frame. These can be spatially compressed, but to maintain image quality, the compression ratios will be held to 10× compression in most instances. Generally, these areas with moving objects take up about 5 percent of an urban area.

Figure 8:
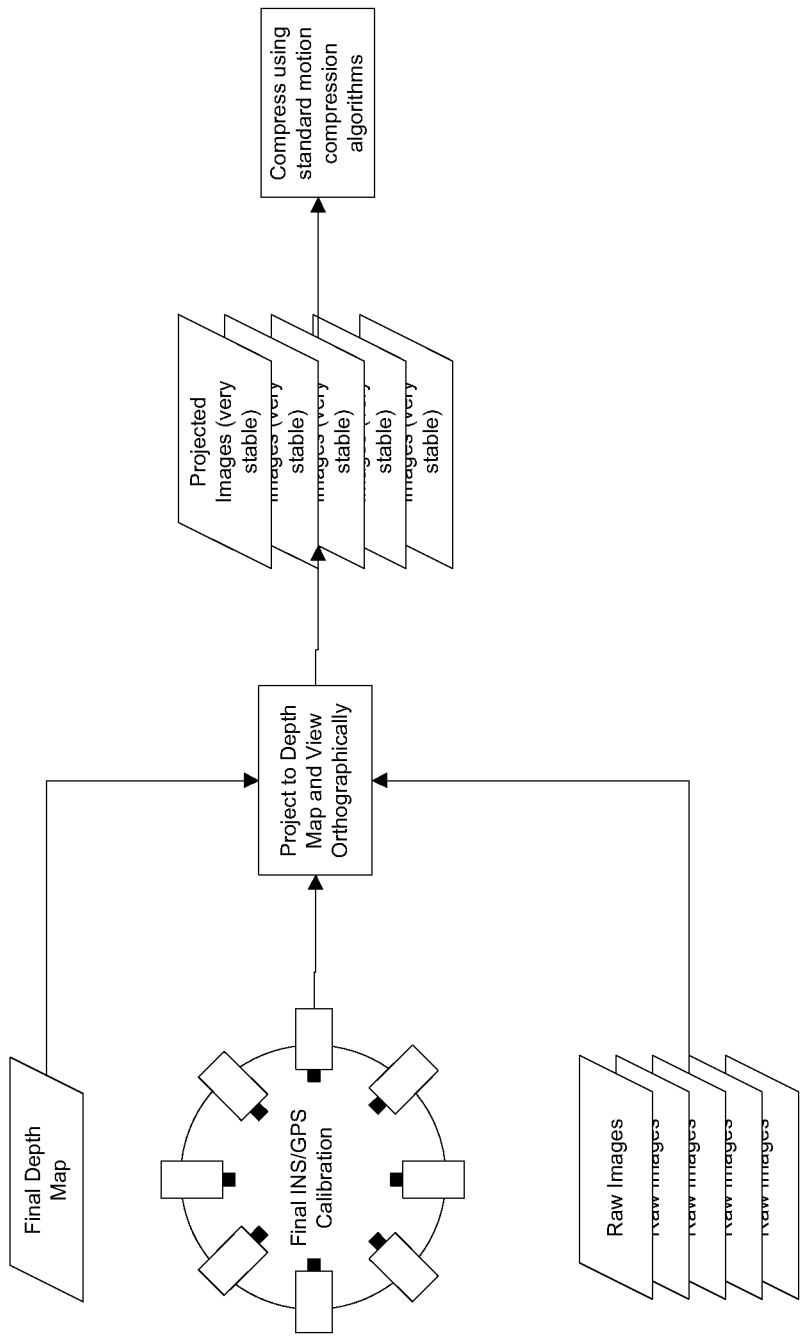
FIG. 8 illustrates an exemplary orthographic compression algorithm according to an embodiment of the disclosure.

Another embodiment for a compression algorithm is to project the imagery orthographically based on the depth model extracted above. See, e.g., FIG. 8. Orthographic projection is the rendering of a scene to a virtual camera with infinite focal length. In one configuration of the compression algorithm, the imagery is projected orthographically using the imagery, depth model, and ephemeris. This projected imagery will be substantially the same from frame to frame, all camera motion having been factored out. This substantial similarity from frame to frame enables a new compression technique that is temporal but does not need to account for motion.

In certain embodiments, it may be determined, e.g., based on the ephemeris and camera model, how each pixel in the depth map should be colored (what grey or color value). An image is then output, e.g., based on the grey or color value at a particular horizontal location and form, an image with the grey value at every location. Using images taken in sequence as the camera moves in an orbit, this process results in a very stable sequence of images that are easily compressed using standard temporal based compression such as MPEG-2 or H.264.

The simplest way to accomplish temporal compression is to use existing motion compression algorithms such as MPEG-2 and h.264. Feeding the output of orthographic projection, or other rendering with a stable virtual camera, will result in substantially improved performance.

Another way to accomplish temporal compression is by subtracting images from a single key image and compressing the difference image. This residual difference image is easier to compress because only the moving objects need to be encoded.

Figure 9:
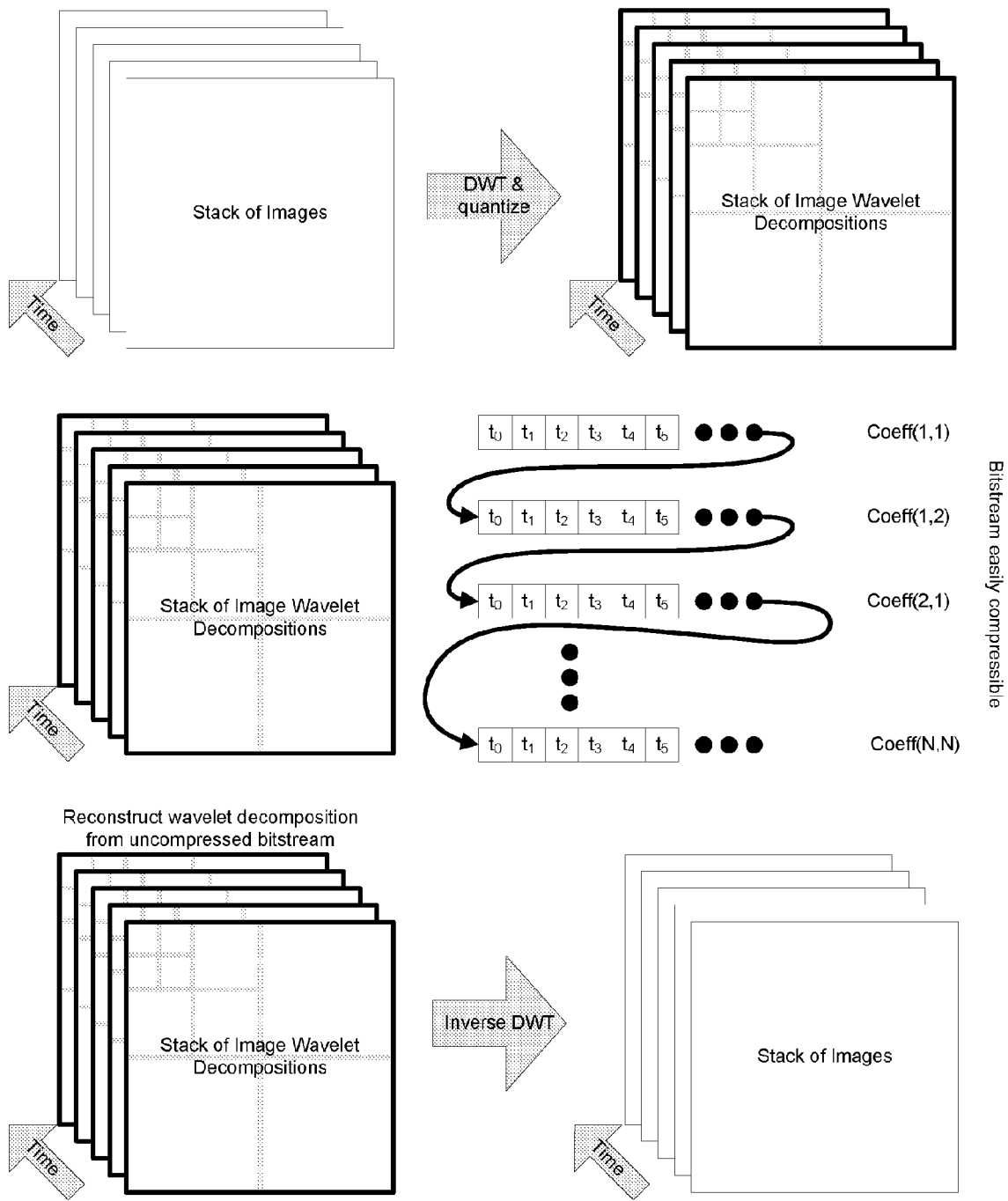
FIG. 9 illustrates an exemplary temporal compression methodology according to an embodiment of the disclosure.

Another way to accomplish temporal compression is by performing a frequency space decomposition on each of the images in a stack of n images. This decomposition could be a discrete cosine transform (DCT) or a discrete wavelet transform (DWT). The decomposed coefficients can then be stacked through time and this bitstream can be compressed. See FIG. 9.

Example C

Refine Model Algorithm

The model created as a result of Example A may be improved if desired to attain improved compression ratios in accordance with Example C. Example A will only generally model horizontal surfaces which are constantly in view. This leaves open the occasionally hidden ground surfaces near buildings, as well as the vertical surfaces on the buildings themselves, and independently moving objects. Further, the model extracted to now does not account for the varying reflectance of many natural surfaces from different angles. Example C will refine the model to account for these variations so that the predicted image is much closer to the actual image. Example C will provide for improved calibration, improved camera positioning estimates, improved depth and texture estimates, etc.

Step A: Occasionally Hidden Surfaces and Dismounts

Step A provides an algorithm to extract location and texture of vertical and hidden surfaces, and an update to the model to account for these surfaces. One of the main challenges encountered during model building/data compression is that the areas of depth discontinuities and movers are the most difficult to compress. Modeling these areas well will provide the greatest improvement to compression algorithms. From Example A, a plane sweep algorithm which finds horizontal patches which are in continuous view is provided. Here, an improved algorithm to account for patches which are occasionally hidden, or covered by independently moving objects is provided.

For hidden horizontal patches, and patches which are occasionally covered by independently moving objects, the difficulty for this algorithm comes from having to choose the correct subset of images which match when rendered to the correct depth. Occlusions by buildings will occur for half the orbit, so surfaces may be located that are consistent when projected to each of the four quarters of the full orbit circle (so that at least one quarter will be wholly contained within the "good half") to find these occlusions. Places which are occasionally covered by independently moving objects may have random times when they are not covered by movers, and thus a search for pairs of images in distance places of the orbit which have a consistent texture when rendered to the proper depth may result in an extraction of the underlying road surface. This search for the right combination of projections will be computationally expensive, but does not look to be intractable.

The extraction of vertical surfaces presents a different problem than the choice of the right location to be rendered from. For this problem a planar patch is swept over a small number of positions and orientations which are close to discontinuities extracted as a result of the extraction of horizontal patches in Example A. Imagery taken within 45 degrees of the normal of this hypothesized patch need only be considered in order that foreshortening from steep look angles is precluded. As the roofs have already been imaged, it will be computationally within reach to extract the walls of the buildings well enough so as to use them for reprojection.

Once the vertical surfaces are added, there will be multiple patches which do not necessarily meet in a fully consistent triangulation. However this will not create issues for compression, because to the extent that the patches don't meet, it means that the image texture was not unique enough to extract the patches well. When rendered, the overlap should not affect the final compression product.

Step B: Refine with Vertical and Hidden Surfaces

Step B provides an integration of the results of Step A with the rendering engine and the compression pipeline. Once the vertical and hidden surfaces are extracted, the rendering engine can operate on a more precise model of the world, and this will result in more accurate predictions of images. These more accurate predictions will result in difference images, which have less information, and thus can be compressed more highly.

Step C: Reflectance in Texture Patch

Step C provides for modeling of the reflectance distribution sufficient to improve compression algorithm losses due to non-Lambertian BRDF and air light. The bidirectional reflectance distribution function (BRDF) for most textures in the world is not lambertian, meaning the texture will not have the same intensity from all angles. Certainly there will be specular components to much of the reflection, and this will cause the texture to look different depending on sun and aircraft position. In addition, air light scattered into the camera forms a significant input to the camera system. Step C will parameterize this nonuniform reflectance and add this parameterization to the texture model used.

Step C: Refine Texture Reflectance

Step C provides integration of non-Lambertian BRDF model with the rendering engine to improve compression performance. If the texture reflectance model is parameterized by aircraft location, recoding the rendering algorithm will take into account the data structures which encapsulate this.

Example D

3D Model Extraction

Much of the work on extracting a scene model for the purpose of compression will have as a side benefit the creation of a 3D scene model. However, the scene model will be optimized for projection to an aerial platform, and viewing the scene from viewpoints not near where data was taken from will require new strategies for making the model look reasonable.

These strategies will require using a priori knowledge of the shape of buildings and trees to overcome the fact that the shape will not be completely determined by the data. For instance, it may be assumed that buildings are parallelepipeds so that wall angles are not a free variable. Further accuracy from low resolution persistent surveillance will likely not be supported by the data.

Example D will provide methodologies for model extraction. Initially, an appropriate 3D markup language will be selected. Any suitable language known to those of skill in the art may be used. The DIS X3D standard is a 3D model standard used by many simulators as input.

Step A: Translate Models to Markup Language

In Step A, algorithms translate internal 3D models to semantically useful models, which can be placed in XML. Step A will consist of taking the raw depth models obtained to support compression and converting them to an XML format which uses identifiable objects as primitives, so that simulations can take place in realistic environments. Ancillary 3D information (e.g. from LIDAR), may be required to supplement 3D models in areas of low texture.

Step B: Translate Better Models to Markup Language

Step B will provide an algorithm to take semantically useful models from Step A and translate them to an XML file. Step B will consist of writing a DIS output algorithm which can take as input the models created as a result of Step A and convert them to an appropriate output language. Again, ancillary 3D information (e.g. from LIDAR), may be required to supplement 3D models in areas of low texture.

Step C: Querying Based on Difference Images

In Step C, an algorithm to allow for querying for changes at a particular time and/or location. Once the models represent the world well, change detection will be an immediate consequence. This is because the difference images should only represent pixels that are not in our model, which is to say, independent objects. It will then be a simple matter to determine whether there are pixels that don't match the model at a particular point in time or space.

An algorithm will be implemented to index the difference images according to where changed pixels are. The outputs of this index will be input into a database, and implement queries to look for changed regions in space and/or time.

Example E

Tracking

The 3D models generated and the registration accomplished through the knowledge of these 3D models will form the basis for improved tracking algorithms. The tracking algorithms based on these models will be able to predict occlusions, shadows, and other impediments to effective tracking. Without being limited by theory, these effects may be predicted through knowledge of the camera and sun position, as well as the kinematics of the vehicles being tracked. These predictions can be used to cue sensors which can extract identification signatures, for example but not limited to spectral signatures, spatial patterns, acoustic signatures, vibrometry, and thermal signatures. These signatures, used in conjunction with the knowledge of track breaks due to the above effects, will allow for the extraction of longer tracks.

Example F

Change Detection

The 3D models generated and the registration accomplished through the knowledge of these 3D models will form the basis for improved change detection algorithms. From obtaining precise knowledge of the pointing of each pixel in the data set, a statistical model may be formed of the lighting properties of each surface on the ground. This can include, but is not limited to, the extraction of the bidirectional reflectance distribution function (BRDF), oscillatory signatures due to wind, shadow maps due to solar illumination properties, and thermal emissive characteristics of thermal imaging sensors.

These statistical models of lighting characteristics of positions on the ground can be used to detect changes. If a new measurement at a particular spot does not fit the statistical model to a certain degree of, it is considered a "detected change" and can be used to alert analysts to that fact.

Example G

Infrared Cameras

The 3D models need not be generated solely from electro-optical (EO) data, but can be generated from infrared cameras, which can operate in the near infrared (NIR), short-wave infrared (SWIR), mid-wave infrared (MWIR), or the long-wave infrared (LWIR). Imagers which work in these wavelengths will have imagery characteristics which can support 3D model creation just as EO cameras can.

Example H

Targeting

The 3D models generated and the registration accomplished through the knowledge of these 3D models will form the basis for improved targeting algorithms. The 3D models generated by these algorithms will be accurate to the level of one pixel, which in some cameras can be projected to the ground at 5 cm or less. This type of accuracy will enable very precise targeting of munitions as well as the capability to download imagery to these munitions to provide terminal guidance information. A targeting pipeline is planned which starts with accurate 3D models with texture mapped imagery and provides very precise geospatial coordinates for guidance during flight, plus imagery of weak target spots such as windows, radiators, or eyes, in order to provide terminal guidance. In addition, the availability of imagery from any viewpoint will enable munitions using such imagery to operate precisely in environments where the global positioning system (GPS) is not available.

Example I

Battle Damage Assessment

The 3D models generated and the registration accomplished through the knowledge of these 3D models will form the basis for improved battle damage assessment algorithms. The 3D models will allow for very fast identification of changes in the 3D structures, which will allow for an estimate of destroyed volume: how much of a building, compound, neighborhood, factory, or city has been destroyed. The 3D model will also be able to extract crater size.

Example J

High Relief Terrain Extraction

In addition to extracting depth models of urban areas with horizontal or vertical surfaces, the depth extraction algorithms described herein can be extended to work on non-rectilinear terrain such as exists in mountainous regions. The plane sweep algorithms, or other depth extraction techniques, can be modified to flexibly extract triangulations or other surface models based on an optimization over all image data. An initial approximation of the surface model is first utilized, and the approximation is then optimized based on its consistency with reprojections to imagery throughout the orbit.

Example K

Line of Sight Analysis

The 3D models generated and the registration accomplished through the knowledge of these 3D models will form the basis for improved line of sight analysis. The 3D models are utilized to calculate the "viewshed" from particular points in 3D space so that users can determine what can be seen from any particular point. The 3D surface model is constructed and converted into a binary space partition, which enables a fast algorithm to determine visibility of any point from any other point. Other possible data structures may be used to determine these visibility constraints.

Example L

Hardware Implementation

Figure 5:
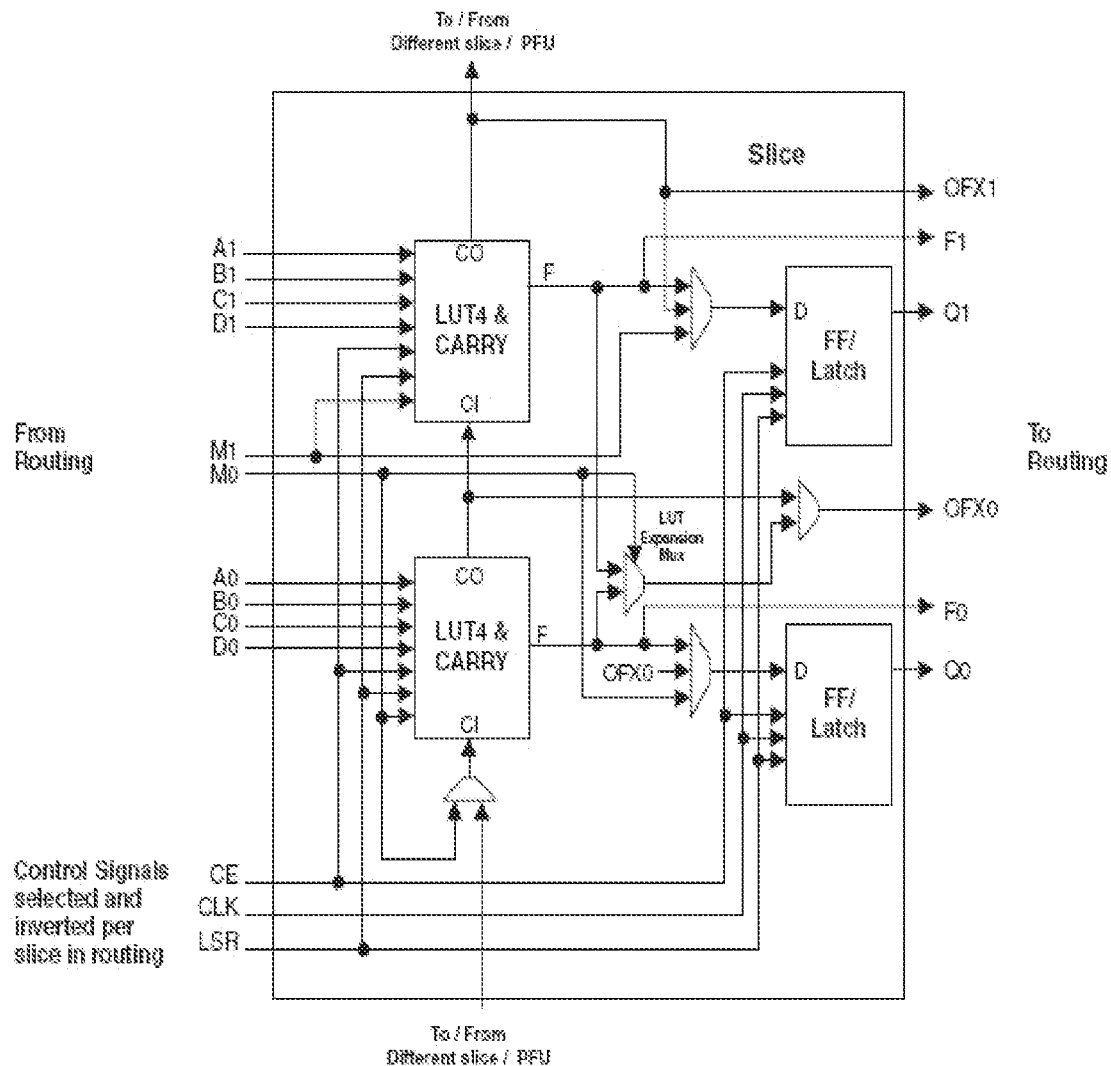
FIGS. 5 and 6 illustrate exemplary hardware according to embodiments of the disclosure.
Figure 6:
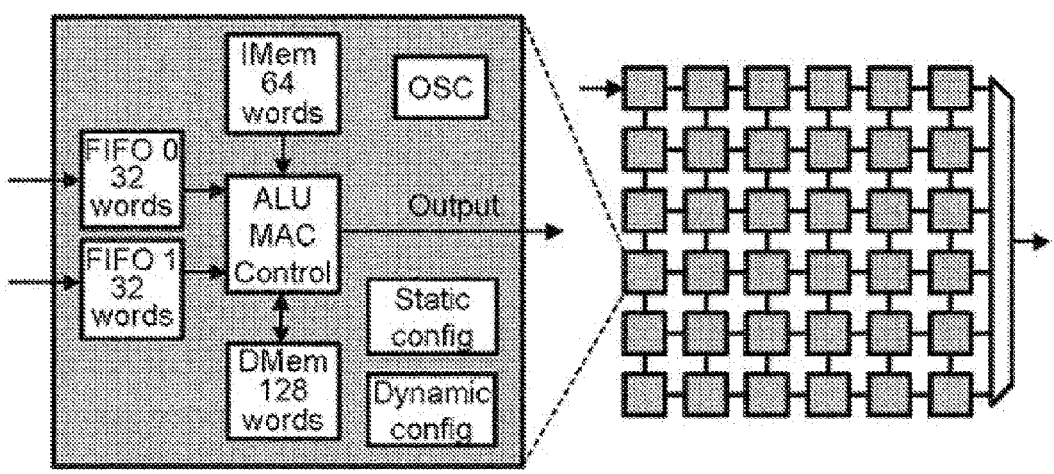

For compression to be useful on small UAVs, it will need to be implemented in hardware. Example E will provide exemplary hardware implementation. Any suitable hardware known in the art may be utilized. Preferred hardware implementation includes use of MPPAs or FPGAs, with MPPAs more preferred. Reference is made to FIGS. 5 and 6.

Field programmable gate arrays (FPGAs) (see FIG. 5) are well suited to calculation, but not very good at conditionals. FPGAs would be effective in a rendering pipeline, but less so for more complex image processing. They have many replications of a look up table, and these can be connected together to form complicated computational chains. However, because there are so many small independent processing units, timing considerations become difficult to manage when conditional logic is important in the processing.

Massively Parallel Processing Architecture (MPPA) (see FIG. 6) are well suited to image processing which require conditional constructs. MPPAs are easier to program, as compared to FPGAs, and can provide an easy scale up. They have hundreds of fully functional processors, each with its own memory, and a way to pipeline data quickly from one processor to the next. This architecture is appealing because many of the operations are identical across the image, thus it would be simple to program in.

Cell Processors, an architecture created by IBM and Sony and currently used in the Sony Playstation, and advanced supercomputing applications, also use the idea of multiple simple processors connected through high bandwidth data links. However, this architecture uses only eight processors per chip.

Multi-core CPUs are becoming mainstream, and processors exist now with eight cores. Chips with more cores are being planned. The advantage of these is their ease of testing and portability with existing desktop applications and libraries. These advantages may outweigh their higher power requirements, but must be looked at more closely.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims, in which all terms are meant in their broadest reasonable sense unless otherwise indicated therein.

What is claimed:

1. A photogrammetric method for compressing and transmitting persistent aerial surveillance data of a location of interest, the method comprising:
    generating a textured depth model of the location of interest for persistent aerial surveillance based on initial aerial imagery of the location of interest captured from different angles circling around the location of interest;
    predicting aerial imagery of the location of interest based on the textured depth model of the location of interest;
    capturing aerial imagery of the location of interest using at least one camera, the at least one camera having a known model and known ephemeris parameters;
    registering at least one frame of the captured aerial imagery to the textured depth model of the location of interest;
    generating a difference image between a captured frame of the captured aerial imagery and a predicted frame of the predicted aerial imagery, wherein the difference image represents pixels of an independent object that are absent from the textured depth model corresponding to a changed region in time or in space;
    spatially compressing the difference image to generate a compressed aerial surveillance data stream; and
    transmitting the compressed aerial surveillance data stream.

2. The method of claim 1, further comprising:
    decompressing the compressed aerial surveillance data stream to generate a decompressed difference image;
    rendering a depth model of the location of interest to an image plane to create a predicted image; and
    adding the decompressed difference image to the predicted image to generate a reconstructed, decompressed image.

3. The method of claim 1, wherein registering the at least one frame of the captured aerial imagery and generating the difference image are carried out substantially contemporaneously with capturing the aerial imagery of the location of interest.

4. The method of claim 1, wherein generating the textured depth model is carried out substantially contemporaneously with capturing the aerial imagery of the location of interest.

5. The method of claim 1, wherein the textured depth model is obtained from a previous persistent surveillance collection.

6. The method of claim 1, wherein the textured depth model is obtained or refined through an additional, independent sensing modality.

7. The method of claim 6, wherein the additional, independent sensing modality comprises a parallel track of Light Detection and Ranging (LIDAR).

8. The method of claim 1, wherein the captured aerial imagery is registered to the textured depth model with reduced parallax induced motion effects so as to improve compression ratios.

* * * * *